US007925816B2

(12) United States Patent
Olesinski et al.

(10) Patent No.: US 7,925,816 B2
(45) Date of Patent: Apr. 12, 2011

(54) ARCHITECTURE FOR AN OUTPUT BUFFERED SWITCH WITH INPUT GROUPS

(75) Inventors: Wladyslaw Olesinski, Sunnyvale, CA (US); Hans Eberle, Sunnyvale, CA (US); Nils Gura, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 289 days.

(21) Appl. No.: 11/731,672

(22) Filed: Mar. 30, 2007

(65) Prior Publication Data

US 2008/0106951 A1     May 8, 2008

Related U.S. Application Data

(60) Provisional application No. 60/857,319, filed on Nov. 6, 2006.

(51) Int. Cl.
*G06F 13/00* (2006.01)
*G06F 13/38* (2006.01)

(52) U.S. Cl. ........... 710/316; 710/72; 710/310; 710/317
(58) Field of Classification Search .......... 710/107, 710/113, 118, 305, 306, 309, 316–317, 52, 710/310, 72
See application file for complete search history.

(56) References Cited

U.S. PATENT DOCUMENTS

| 4,807,183 | A  | * | 2/1989  | Kung et al.   | 710/317 |
| 6,496,889 | B1 | * | 12/2002 | Perino et al. | 710/110 |
| 6,557,070 | B1 | * | 4/2003  | Noel, Jr.     | 710/317 |
| 6,697,420 | B1 | * | 2/2004  | Simon et al.  | 375/220 |
| 7,490,189 | B2 | * | 2/2009  | Eberle et al. | 710/317 |
| 2005/0099945 | A1 | * | 5/2005 | Abel et al.    | 370/230 |
| 2008/0107021 | A1 | * | 5/2008 | Olesinski et al. | 370/230 |

OTHER PUBLICATIONS

"Proximity Communication—the Technology". Sep. 10, 2004. Sun Microsystems, Inc. Retrieved from Internet Feb. 19, 2009. <http://research.sun.com/spotlight/2004-09-20.feature-proximity.html>. pp. 1-3.*
Delgado-Frias, Jose G. et al. "A VLSI Crossbar Switch with Wrapped Wave Front Arbitration". IEEE Transactions on Circuits and Systems—I: Fundamental Theory and Applications. vol. 50, No. 1. Jan. 2003. pp. 135-141.*
Minkenberg, Cyriel, et al. "Low-Latency Pipelined Crossbar Arbitration". May 2004. IEEE. IEEE Communication Society Globecom 2004. pp. 1174-1179.*
Chao, H. Jonathan, et al. "Centralized Contention Resolution Schemes for A Large-Capacity Optical ATM Switch". May 1998. IEEE. pp. 11-16.*

(Continued)

*Primary Examiner* — Thomas J Cleary
(74) *Attorney, Agent, or Firm* — Park, Vaughan, Fleming & Dowler LLP; Anthony Jones

(57) ABSTRACT

Embodiments of the present invention provide a system that transfers data between the components in the computer system through a switch. In these embodiments, the switch includes multiple switch chips which are coupled together and are configured to collectively function as a switch. During operation, each switch chip, receives cells from the subset of the set of inputs and selectively transfers each of the cells to at least one output of the subset of the set of outputs coupled to the switch chip or of the subset of the set of outputs coupled to the other switch chips.

18 Claims, 8 Drawing Sheets

OTHER PUBLICATIONS

Publication: Mora et al. entitled "*Towards an Efficient Switch Architecture for High-Radix Switches*", ANCS Dec. 3-5, 2006, San Jose, CA, ACM 0-59593-580-0/06/0012.

Publication: Eiji Oki et al., entitled "*A Pipeline-Based Approach for Maximal-Sized Matching Scheduling in Input-Buffered Switches*", ICEE communications letters, vol. 5, No. 6, Jun. 2001, pp. 263 to 265.

Publication: Thomas E. Anderson, "*High Speed Switch Scheduling for Local Area Networks*", Digital Equipment Corporation Systems Research Center, 130 Lytton Avenue, Palo Alto, CA 94301, pp. 1 to 13.

Publication: Isaac Keslassy et al., *Scaling Internet Routers Using Optics* (*Extended Version*), Stanford HPNG Technical Report TR03-HPNG-080101, pp. 1 to 16.

Publication: Nick McKeown, "*The iSLIP Scheduling Algorithm for Input-Queued Switches*", IEEE/ACM transactions on networking, vol. 7, No. 2, Apr. 1999, pp. 188 to 201.

Publication: Manolis Katevenis et al., "*Variable Packet Size Buffered Crossbar (CICQ) Switches*", IEEE Int. Conference on Communications (ICC 2004) Paris, France,, Jun. 20-24, 2004, pp. 1 to 7.

Publication: Yuval Tamir et al., "*Symmetric Crossbar Arbiters for VLSI Communication Switches*", IEEE Transactions on Parallel and Distributed Systems, vol. 4, No. 1, 1993, pp. 13 to 27.

Publication: Robert J. Drost et al., "*Proximity Communication*", IEEE Journal of Solid-State Circuits, vol. 39, No. 9, Sep. 2004, pp. 1529 to 1535.

* cited by examiner

US 7,925,816 B2

ARCHITECTURE FOR AN OUTPUT BUFFERED SWITCH WITH INPUT GROUPS

RELATED APPLICATIONS

This application hereby claims priority under 35 U.S.C. §119(e) to U.S. Provisional Application Ser. No. 60/857,319, filed on 6 Nov. 2006, the contents of which are herein incorporated by reference.

BACKGROUND

1. Field of the Invention

Embodiments of the present invention relate to the design of switches. More specifically, embodiments of the present invention relate to the design of multi-chip switches that use proximity communication.

2. Related Art

Large switches with hundreds of ports that support high throughput require scalable architectures. Unfortunately, switch designers have struggled to create an architecture that can scale to meet the bandwidth demands of a typical large switch.

Smaller switches are typically constructed using crossbars, which provide matrices of cross points that selectively transfer cells from N inputs to N outputs. While attractive for relatively small switches, crossbars do not scale well to large switches because the number of cross points grows quadratically with the number of ports. Furthermore, the task of scheduling transfers through a crossbar can be difficult.

To reduce the difficulty of scheduling a crossbar, some designers have suggested using a buffered crossbar switch that adds buffers to every cross-point in the crossbar. Unfortunately, this approach does not scale well because of the large amount of memory required to place buffers in every cross-point.

To reduce the number of cross-points which are required for a crossbar, some designers have proposed using multi-stage switches. For example, Clos networks are a commonly used multi-stage architecture. The non-blocking variant of the Clos network allows for the conflict-free transferring of cells from any unmatched input to any unmatched output through the switch. However, because of its multi-stage design, the non-blocking Clos network requires very high connectivity.

Some designers have suggested using so-called blocking architectures because such switches are less complex than non-blocking switches. Unfortunately, blocking architectures create difficulties with routing and flow control across multiple stages. For example, head-of-line (HOL) blocking can arise when cells arriving at the same input port are destined for different output ports.

Another approach is to use a load-balanced switch, which simplifies the scheduling problem by distributing the switching across three stages. The first stage evenly distributes cells among second stage queues, which then forward cells to destination output ports in the third stage. This solution scales better than other solutions but suffers from high latency, out-of-order delivery of cells, doubled switching capacity, and difficulties with adding and removing line cards from the switch.

Some switch designers have considered optical switches as an alternative to electrical switches. Optical switches can transfer packets at high enough rates to avoid many of the scalability issues that hamper electrical switches. However, due to their cost and complexity, designers have not been able to produce a practical implementation of an optical switch.

Hence, what is needed is a switch which does not suffer from the above-described problems.

SUMMARY

Embodiments of the present invention provide a system that transfers data between the components in the computer system through a proximity communication switch. In these embodiments, the proximity communication switch includes multiple switch chips which are coupled together and are configured to collectively function as a switch, wherein the multiple switch chips communicate with each other using proximity communication. During operation, each switch chip, receives cells from the subset of the set of inputs and selectively transfers each of the cells to at least one output of the subset of the set of outputs coupled to the switch chip or of the subset of the set of outputs coupled to the other switch chips.

In some embodiments, each switch chip schedules conflict-free transfers of cells received from the subset of the set of inputs to at least one output of the subset of the set of outputs coupled to the switch chip or of the subset of the set of outputs coupled to the other switch chips.

In some embodiments, each switch chip uses a parallel wrapped wave front arbiter (PWWFA) to schedule transfers in a conflict-free manner.

In some embodiments, each switch chip stores cells transferred from the switch chip or from the other switch chips in a separate buffer coupled between the subset of inputs coupled to each switch chip and each output coupled to the switch chip before forwarding the cells to the subset of the set of the outputs coupled to the switch chip.

In some embodiments, each switch chip uses an output arbiter to control the forwarding of cells from the set of buffers to the corresponding output.

In some embodiments, when a buffer on a switch chip fills up with cells that are waiting to be forwarded to an output, the switch chip signals the switch chip that is transferring cells to the buffer to stop transferring cells until space is available in the buffer.

In some embodiments, the proximity communication includes at least one of: (1) capacitive communication; (2) inductive communication; or (3) optical communication.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a switch wherein the switch fabric, the scheduler, and other switch structures are distributed across multiple chips. Each chip includes a subset of input and output ports and a reduced number of cross-point buffers.

Unlike some switches, some embodiments of the present invention do not include a scheduler that schedules the transfer of cells from all input ports. Instead, a local, per-chip scheduler schedules the transfer of cells from the subset of input ports on each chip to the output ports on the chip or on another chip. In some embodiments, the local scheduler is a parallel wrapped wave front arbiter (PWWFA).

In some embodiments, the cells transferred from the subset of the input ports on each chip are placed in output buffers on the receiving chip and are eventually forwarded from the output buffers to the outputs according to a schedule determined by an output arbiter. In these embodiments, the output buffers are shared by groups of input ports (i.e., the subset of input ports on a given chip share an output buffer for each output). Sharing the buffer on the output port in this way significantly decreases the required memory (when compared to an architecture such as the buffered crossbar which provides a separate memory for each input-output combination).

In some embodiments, proximity communication is used to communicate among the multiple chips in the switch. The use of the high-bandwidth proximity communication facilitates the distribution of the switch over multiple chips, without the communication bandwidth limitations associated with traditional interconnect technologies (e.g. wired interconnects).

Proximity Communication

Figure 1A:
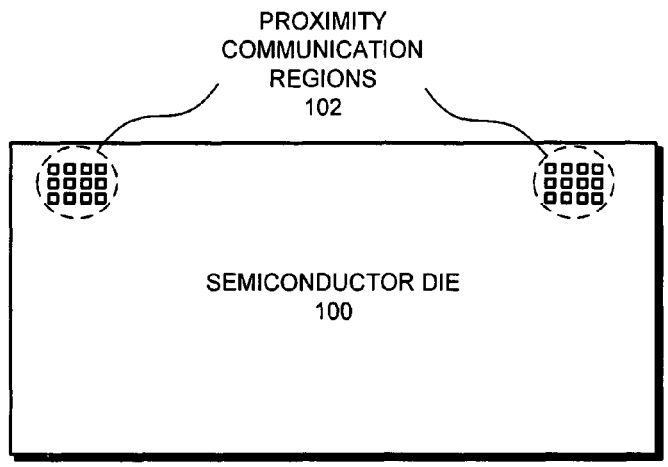
FIG. 1A illustrates a semiconductor die that includes proximity communication regions in accordance with embodiments of the present invention.

FIG. 1A illustrates a semiconductor die 100 that includes proximity communication regions 102 in accordance with embodiments of the present invention. Note that semiconductor die 100 may be packaged in a single-chip module (SCM) and/or a multi-chip module (MCM), wherein the MCM may include two or more SCMs. When packaged, semiconductor die 100 is sometimes referred to as a "chip."

In some embodiments, the proximity communication regions 102 may be on or proximate to at least one surface of the semiconductor die 100 (or the chip). In other embodiments, the semiconductor die 100 may be coupled to the proximity communication regions 102.

Figure 1B:
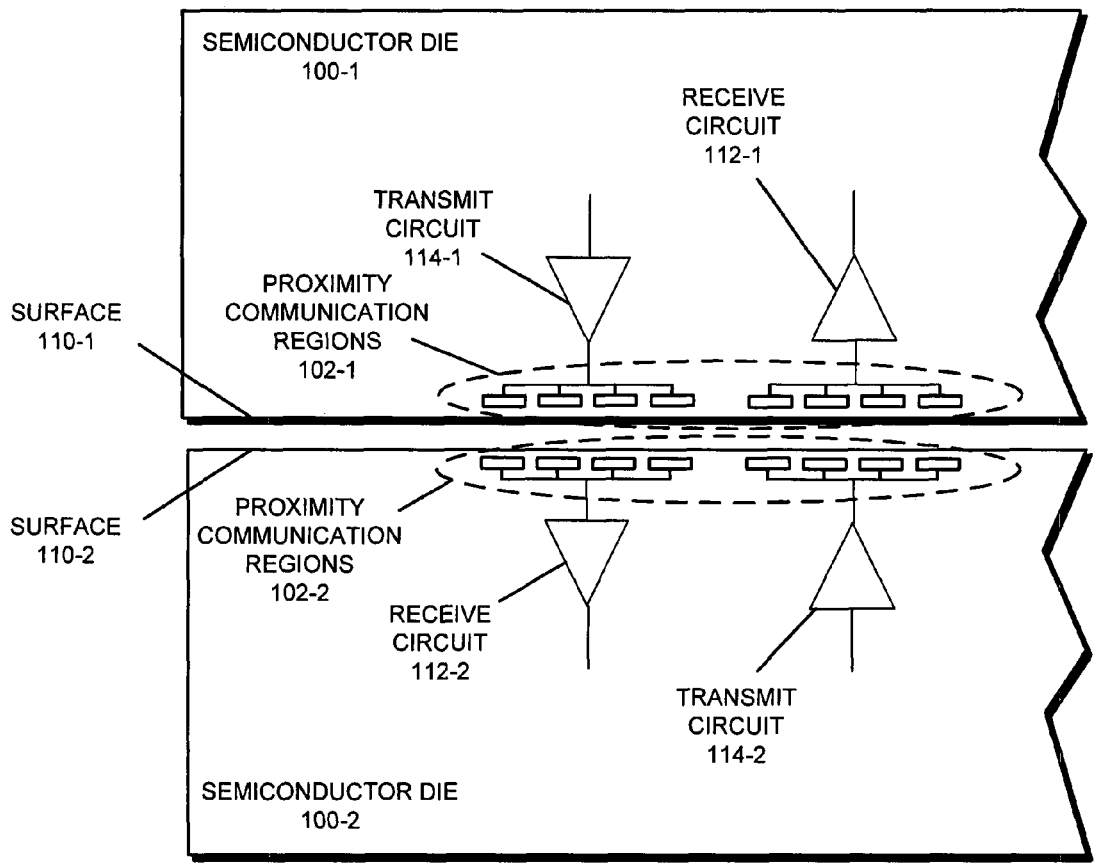
FIG. 1B illustrates semiconductor dies that communicate using proximity communication in accordance with embodiments of the present invention.

FIG. 1B illustrates semiconductor dies 100-1 and 100-2 that communicate using proximity communication in accordance with embodiments of the present invention. Semiconductor dies 100-1 and 100-2 can include proximity communication regions 102-1 and 102-2 that are located on or proximate to respective surfaces 110-1 and 110-2 of the semiconductor dies. For example, proximity communication regions 102-1 and 102-2 may be situated beneath protective layers so they reside below surfaces 110-1 and 110-2. Moreover, subsets of the proximity communication region 102-1 and 102-2 may be coupled to transmit circuits 114-1 and 114-2 (such as transmit drivers) and receive circuits 112-1 and 112-2.

A proximity communication channel includes a transmit circuit 114, at least a subset of the proximity communication region 102 on the adjacent semiconductor dies 100, and one of the receive circuits 112. For example, the communication channel may include transmit circuit 114-1, some of the proximity communication region 102, and receive circuit 112-2. Note that we call a bundle of one or more of these proximity communication channels a "proximity communication link."

Transmit circuits 114-1 and 114-2 and receive circuits 112-1 and 112-2 may use voltage-mode signaling (i.e., voltage-mode drivers and receivers). Furthermore, semiconductor dies 100 may also include wiring and electronics (not shown) to relay the data signals to additional circuitry on the semiconductor dies 100, such as logic, memory (for example, a packet buffer memory), I/O ports, demultiplexers, multiplexers, and switching elements.

While we describe capacitively coupled proximity communication regions 102 for the purposes of illustration, some embodiments of the present invention use inductively coupled proximity communication regions, wherein data signals are communicated inductively between terminals on adjacent semiconductor dies 100. Other embodiments use optical proximity communication regions, wherein data signals are communicated optically between terminals on adjacent semiconductor dies 100. Yet other embodiments couple connectors in adjacent semiconductor dies 100 using an array of solder balls.

Note that interconnects that use proximity communication may have significantly increased bandwidth (particularly when compared to traditional wired interconnects). More specifically, proximity communication offers I/O densities of several $Tb/s/mm^2$ or more, which corresponds to data rates of tens of Tb/s for a reasonably-sized proximity communication region.

Proximity Communication Overlap Patterns

Figure 2A:
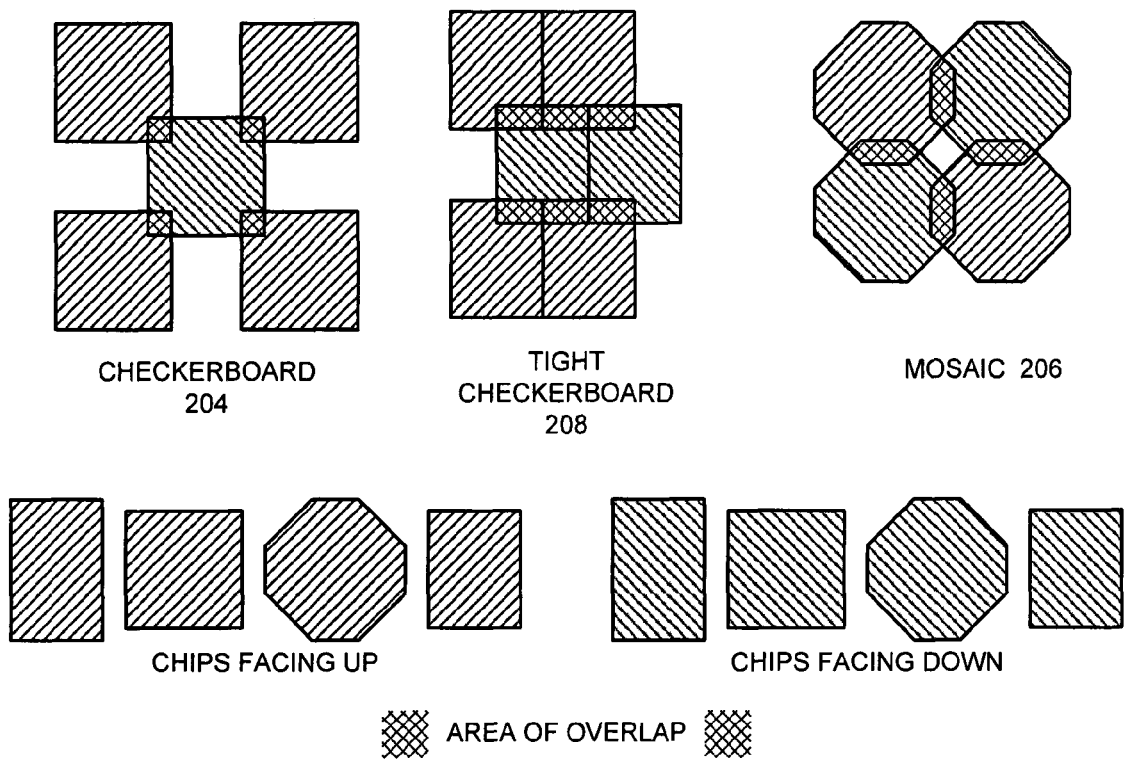
FIG. 2A presents various overlap patterns for chips that use proximity communication in accordance with embodiments of the present invention.

FIG. 2A presents various overlap patterns for chips that use proximity communication in accordance with embodiments of the present invention. Each pattern offers a different amount of overlap between switch chips. Some embodiments maximize the overlap between chips, such as mosaic 206 and tight checkerboard 208. On the other hand, some embodiments maximize space between chips to facilitate heat removal, such as in checkerboard 204.

Various tradeoffs exist with each pattern as well. More overlapping among chips might result in better bandwidth between chips. However, because more of the chip is being used for chip-to-chip communication, less of the chip can be used for other functions. Specific chip arrangements might prove to be optimal for specific types of chips as well.

Figure 2B:
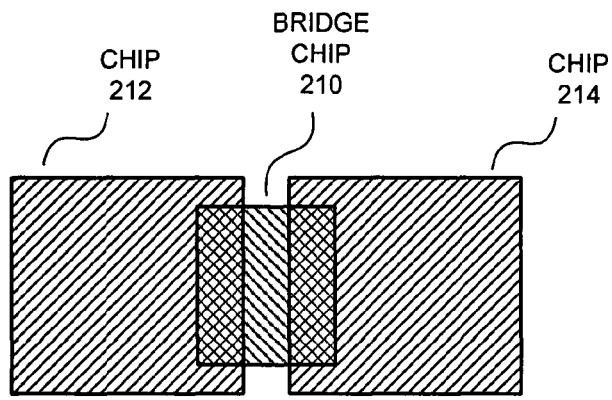
FIG. 2B presents a bridge chip arrangement for chips that communicate using proximity communication in accordance with embodiments of the present invention.

FIG. 2B illustrates a bridge chip arrangement for chips that use proximity communication in accordance with embodiments of the present invention. In these embodiments, bridge chip 210 provides one or more communication channels from chip 212 to chip 214. Bridge chip 210 includes a set of signal lines (which can include transmit circuits 114 and receive circuits 112) that couple a set of proximity communication regions 102 on bridge chip 210. Proximity communication regions 102 on chips 212 and 214 are aligned with proximity communication regions 102 on bridge chip 210, which allows chips 212 and 214 to communicate with one another using the interconnect lines on bridge chip 210. Bridge chip 210 can also include a number of other circuit structures, such as repeaters, memories, logic circuits, and clock circuitry which can be used during the communication of signals between chip 212 and chip 214 (or which can perform other functions).

Switch

Figure 3:
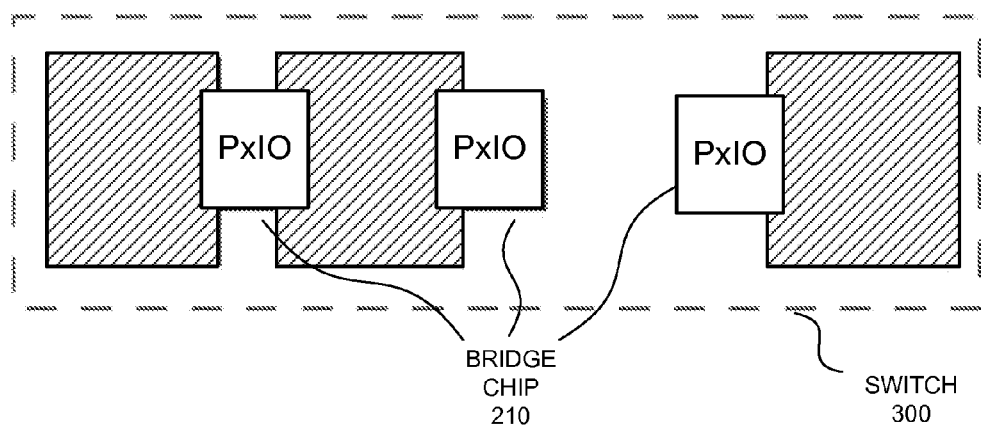
FIG. 3 illustrates a switch that uses proximity communication in accordance with embodiments of the present invention.

FIG. 3 illustrates a switch 300 that uses proximity communication in accordance with embodiments of the present invention. For the purposes of illustration, we assume that switch 300 is a 12×12 switch (i.e., switch 300 has 12 input ports and 12 output ports). Although we describe a 12×12 switch, alternative embodiments using other numbers of input/output ports (or numbers of switch chips) can operate using the same principles.

Note that we use the term "cell" to describe units of data that are transferred using switch 300. In some embodiments, cells are of a fixed size, while in other embodiments, cells are of variable sizes. In addition, in the case of fixed-sized cells, we use the term "slot" to describe the ratio of the cell size to the line rate. More specifically, a slot corresponds to the transmission time of a cell.

As shown in FIG. 3, switch 300 includes M chips that communicate with each other using proximity communication. In some embodiments, the M chips communicate with each other through bridge chips 210 (see FIG. 2B). In these embodiments, the M chips can be arranged in a number of topologies. For example, as shown in FIG. 3, the M chips can be arranged in a vector topology. Alternatively, the M chips can be arranged in a ring topology, a star topology, a tiled topology, or another topology that facilitates communication between the M chips through the bridge chips using proximity communication.

In alternative embodiments, the M chips overlap and communicate directly with each other (see FIG. 2A). In these embodiments, the M chips can be arranged in a number of topologies. For example, the M chips can be arranged in a vector, a ring topology, a star topology, a tiled topology, or another topology that facilitates communication between the M chips using proximity communication.

Every chip has K output (or input) ports, which provides a total of N=KM output ports for the entire switch. For example, the total number of output ports for the switch is N=12 when the number of chips is M=3, and the number of output ports per switch chip is K=4. Note that chip 1 has output ports numbered 1 ... K, chip 2 has output ports numbered K+1 ... 2K, etc. In general, chip C has output ports numbered (C−1)K+1 ... CK, for 0<C<=M.

Figure 4:
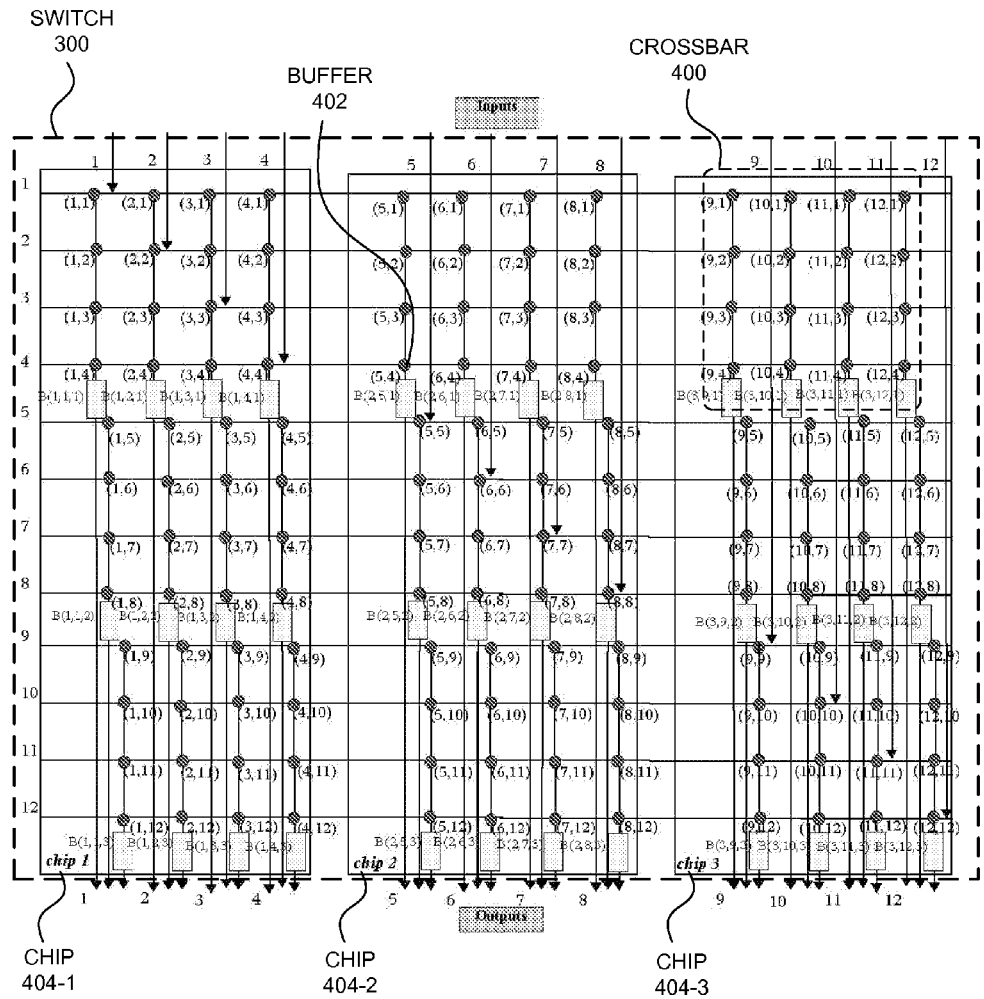
FIG. 4 presents a schematic of a switch in accordance with embodiments of the present invention.

FIG. 4 presents a schematic of a switch 300 in accordance with embodiments of the present invention. Each chip in switch 300 includes M K×K crossbars 400. Each crossbar 400 has K columns corresponding to local output ports and K rows (buses) used to deliver cells to destinations located on the same switch chip or on a different switch chip via proximity communication links. Within switch 300, cross-points are denoted (c, r), where c is a column number and r is a row number such that 0<c<=N and 0<r<=N.

Every crossbar 400 has K buffers 402, one for each column. The buffers 402 are numbered B(C, c, m), where C is a chip number, c is a column number, and 0<m<=M is a crossbar number within a chip, counting from top to bottom. The buffers 402 store cells received from the K rows in a given crossbar 400 before forwarding the cells to the outputs of the chip. Each chip has a total of KM=N buffers 402.

Figure 5:
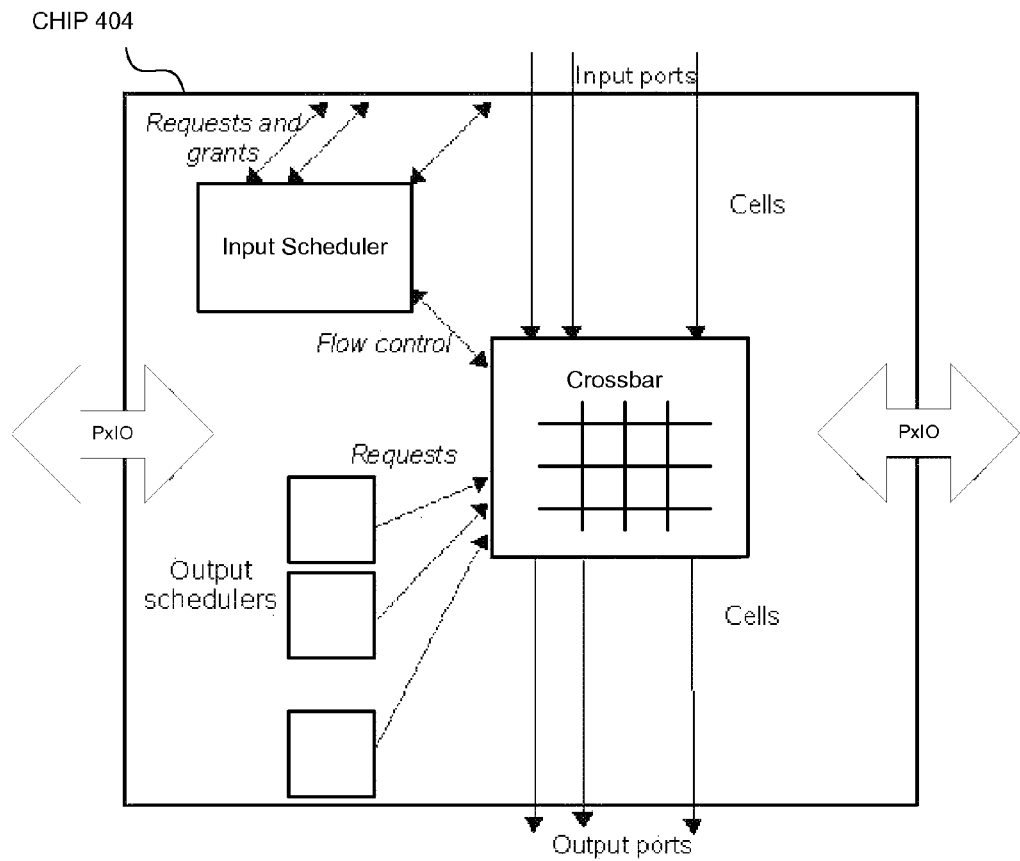
FIG. 5 presents a high-level structural diagram of a chip in a switch in accordance with embodiments of the present invention.

FIG. 5 presents a high-level structural diagram of a chip, such as chip 404-1, in switch 300 in accordance with embodiments of the present invention. As shown in FIG. 5, chip 404-1 includes: a K×N crossbar (which includes M K×K crossbars), an input scheduler, and an output arbiter. The crossbar is described in more detail above with reference to FIG. 4.

Input Scheduler

Each chip has its own scheduler that matches the K local input ports with the N output ports. Chip C with ports numbered (C−1)K+1 ... CK uses the bus lines (C−1)K+1 ... CK to forward cells to the output ports.

Let us trace a path of a cell in chip C that was selected by the scheduler for forwarding from input port s to output port d (where (C−1)K+1<=s<=CK and 0<d<=N). Using column s, the cell is first forwarded to row s. The cell is then forwarded from row s to the cross-point (d,s) for destination column d. From cross-point (d,s), the cell is forwarded to buffer B(C,d,m), where m is the crossbar number (m=⌈s/K⌉). Next, an output arbiter removes the cell from buffer B(C,d,m) and forwards the cell to the output port at column d.

For example, assume that in an N=12 port switch using M=3 chips, with K=4 ports per chip (see FIG. 4), the scheduler in chip 1 (chip 404-1) selects a cell from input port s=3 to be forwarded to output port d=7 in chip 2 (chip 404-2). This cell is first forwarded to row s=3 and then to cross-point (7,3) for destination column d=7. From cross-point (7,3), the cell is forwarded to buffer B(2,7,1). Next, an output arbiter removes the cell from buffer B(2,7,1) and forwards the cell to output port 7.

In another example for the N=12 port switch using M=3 chips, a cell from input port s=6 (chip 404-2) which is addressed to output port d=1 (chip 404-1) is first forwarded to row s=6, and then to cross-point (1,6) for destination column d=1. From cross-point (1,6), the cell is forwarded to buffer B(1,1,2). Later, an output arbiter removes the cell from buffer B(1,1,2) and forwards the cell to output port 1.

Some embodiments of the present invention use a parallel wrapped wave front arbiter (PWWFA) to find matches between the K input ports (each with N VOQs) and the N output ports (i.e., as the input scheduler). The PWWFA includes a matrix of transfer elements to maintain and process output requests. By performing "waves" of processing concurrently on the matrix of transfer elements, the PWWFA can schedule multiple slots simultaneously. The PWWFA is explained in more detail in a pending U.S. patent application entitled, "Parallel Wrapped Wave Front Arbiter," by inventors Wladyslaw Olesinski, Hans Eberle, and Nils Gura, having Ser. No. 11/731,590, and filing date 29 Mar. 2007, which is hereby incorporated by reference to explain the PWWFA.

Alternative embodiments of the present invention use other types of arbiters to find matches between the K input ports (each with N VOQs) and the N output ports. For example, embodiments can use a PIM scheduler (described by T. Anderson, S. Owicki, J. Saxe, and C. Thacker in "*High Speed Switch Scheduling for Local Area Networks,*" ACM Trans. Comput. Syst., vol. 11, no. 4, pp. 319-352, November 1993), an iSLIP scheduler (described by N. McKeown in "*The iSlip Scheduling Algorithm for Input-Queued Switches,*" IEEE/ACM Transaction on Networking, vol. 7, no. 2, April 1993), or a DRRM scheduler (described by H. J. Chao and J. S. Park, "*Centralized Contention Resolution Schemes for a Large-Capacity Optical ATM Switch*," Proc. IEEE ATM Workshop '97, Fairfax, Va., May 1998), find the matches by iterative, input/output round-robin arbitration.

On the other hand, some embodiments use pipelined iterative schemes for the input scheduler, such as the scheme described in C. Minkenberg, I. Iliadis, and F. Abel, "*Low-Latency Pipelined Crossbar Arbitration*," IEEE Global Telecommunications Conference 2004 (GLOBECOM '04), vol. 2, pp. 1174-1179, November 2004 or the scheme described in E. Oki, R. Rojas-Cessa, and H. J. Chao, "*A Pipeline-Based Maximal-Sized Matching Scheme for High-Speed Input-Buffered Switches*," IEICE Transactions on Communications, vol. E85-B, no. 7, pp. 1302-1311, July 2002.

Yet other embodiments use the wrapped wave front arbiter (WWFA) described by Y. Tamir and H. C. Chi, "*Symmetric Crossbar Arbiters for VLSI Communication Switches*," IEEE Transactions on Parallel and Distributed Systems, vol. 4, issue 1, pp. 13-27, January 1993 as the input scheduler.

Output Arbiter

Figure 6A:
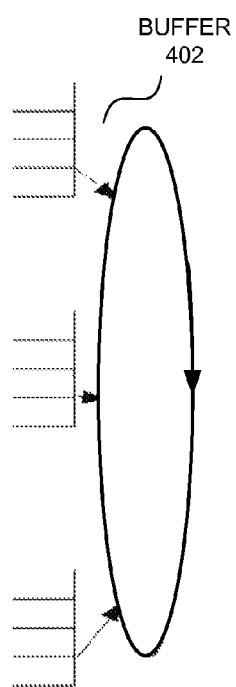
FIG. 6A illustrates an arbitration scheme for an output arbiter in accordance with embodiments of the present invention.

FIG. 6A illustrates an arbitration scheme for an output arbiter in accordance with embodiments of the present invention. In some embodiments, each chip 404 (see FIG. 4) in switch 300 (see FIG. 3) has one output arbiter per output port (i.e., per column). The output arbiter for an output port forwards cells from the M buffers 402 of the column to the output port.

Recall that a group of input ports shares the same output buffer. For example, buffer B(2,7,1) in the seventh column of the first crossbar in chip 2 (chip 404-2 in FIG. 4) is shared by traffic flowing from input ports 1, 2, 3 and 4. The output arbiter for a given output port determines when cells are forwarded to the corresponding output ports from buffers. This effectively divides the bandwidth available on the output port between the input ports that share the buffers.

Embodiments of the present invention can be biased against traffic flowing from some ports, depending on the traffic pattern. This bias can be observed in the following scenario.

Assume that inputs 7, 8, and 2 are sending cells to output port 6 and that input ports 7 and 8 are located on the same chip (chip 404-2) as output port 6. During operation, in a first slot, a cell from input port 2 arrives to buffer B(2,6,1) and a cell from either 7 or 8 arrives to buffer B(2,6,2). In the next slot, another cell from input port 2 arrives to buffer B(2,6,1) and a cell from either 7 or 8 arrives at buffer B(2,6,2).

Assuming for simplicity that buffer B(2,6,3) is empty, when the output arbiter subsequently forwards cells to the corresponding output, the output arbiter alternates between buffers B(2,6,1) and B(2,6,2), removing a cell from one of them in every slot. A possible order of how cells are forwarded to the output port is as follows (cells are identified by the buffer location and the source input port):

B(2,6,1) input 2∥B(2,6,2), input 7∥B(2,6,1), input 2∥B(2,6,2), input 8.

As can be seen in this possible order, input port 2 is served twice as often as input ports 7 and 8. To restore fairness, embodiments of the present invention replace the basic round-robin output arbiter with one of the following schemes.

Figure 6B:
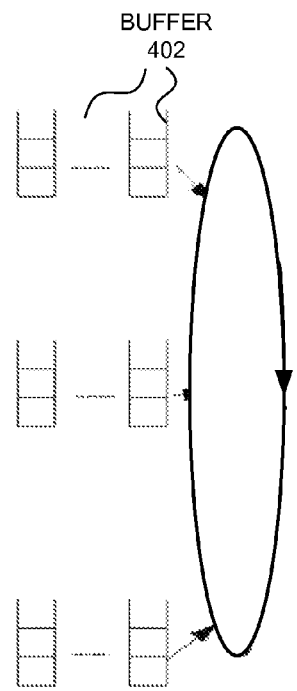
FIG. 6B illustrates an arbitration scheme for an output arbiter in accordance with embodiments of the present invention.

FIG. 6B illustrates an arbitration scheme for an output arbiter in accordance with embodiments of the present invention. The output arbiter in FIG. 6B divides each buffer into K logical queues, wherein there exists one logical queue per input port and where in a given buffer receives cells from K input ports. During operation, the output arbiter considers the buffers round-robin. When the output arbiter processes a buffer, the output arbiter serves the next non-empty logical queue after the last queue served.

Figure 6C:
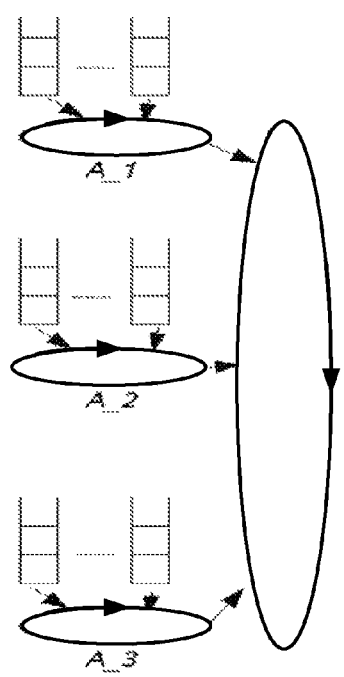
FIG. 6C illustrates an arbitration scheme for an output arbiter in accordance with embodiments of the present invention.

FIG. 6C illustrates another arbitration scheme for an output arbiter in accordance with embodiments of the present invention. In FIG. 6C, the output arbiter is partitioned into M+1 output arbiters. In other words, in contrast with embodiments that include one arbiter that arbitrates between N logical queues, these embodiments include M local arbiters that deal with N/M queues each and a global arbiter that deals with M local arbiters. These embodiments operate in the following way.

Each of the buffers has an independent "local" output arbiter that arbitrates between K queues (see FIG. 6C). Let us call these arbiters $A\_1, A\_2, \ldots, A\_M$. There is also one "global" arbiter A that arbitrates between all local arbiters in the column (Note that all buffers in a column drain to the same output port).

Assume that global arbiter A is currently processing cells fetched by local arbiter $A\_1$. This local arbiter removes cells from the logical queues in round-robin fashion and presents them to global arbiter A. A, in turn, forwards the cells to the output port. Arbiter A starts processing cells from the next arbiter $A\_2$ only after $A\_1$ has fetched one cell from every non-empty logical queue. In other words, A processes cells provided by $A\_1$ until $A\_1$ makes one full round of all non-empty queues. Arbiter A then processes cells fetched by $A\_2$, while all the other arbiters are idle, waiting for their turn. In this way, every non-empty logical queue, which corresponds to an input port, gets an equal share of the output port's bandwidth.

Flow Control

To avoid buffer overflow, embodiments of the present invention implement flow control between the input scheduler and the output buffers. When a buffer fills with cells awaiting forwarding, the flow control signals the input scheduler (either on the local switch chip or on another switch chip) to halt the scheduling of cells for the buffer. In some embodiments, the flow control signals the input ports (either on the local switch chip or on another switch chip) to stop transmitting cells for the buffer.

In some embodiments of the present invention, the flow control is credit-based. In other embodiments, the flow control is xon/xoff.

Transferring Process

Figure 7:
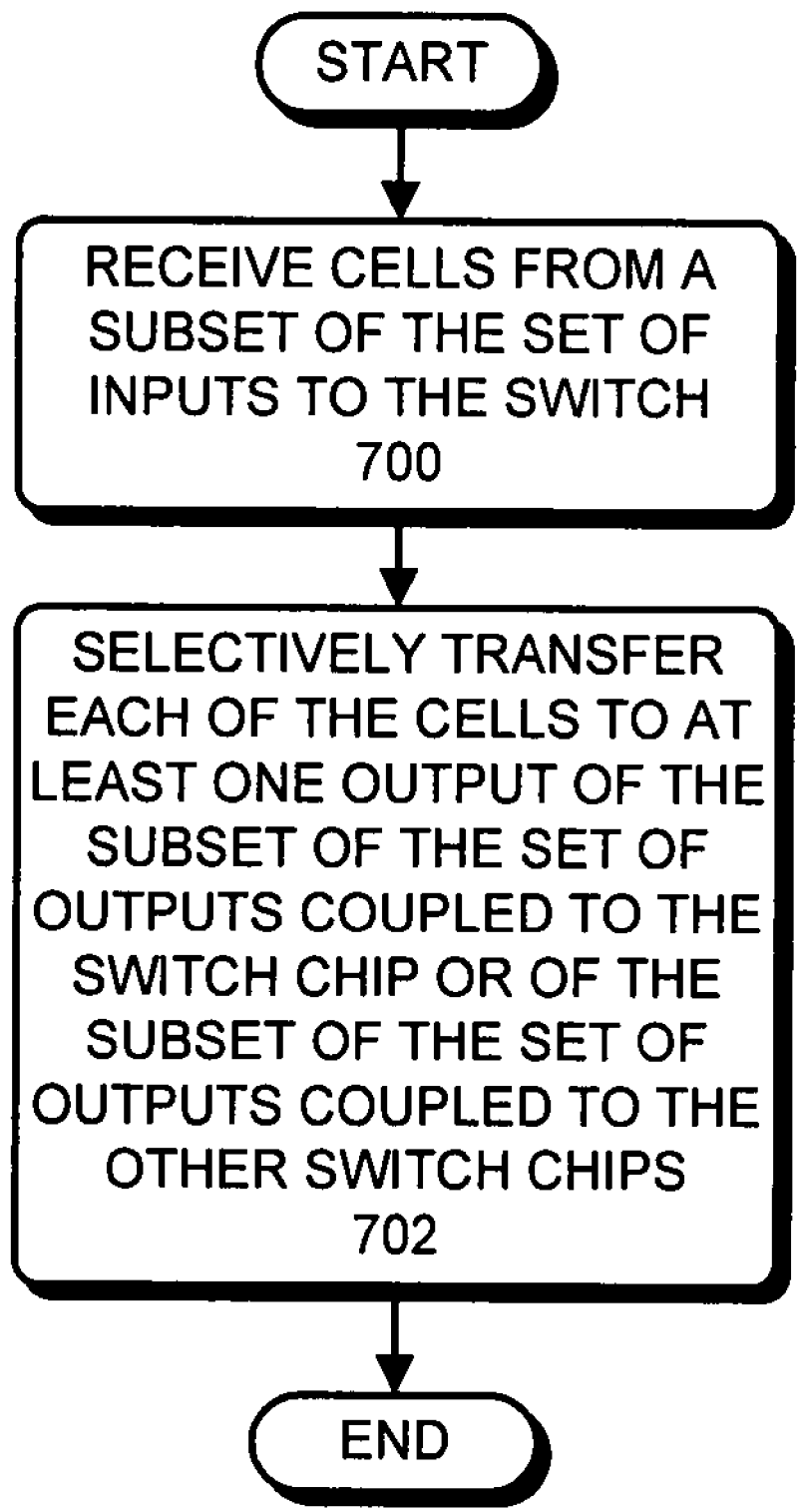
FIG. 7 presents a flowchart illustrating the process of transferring cells in a switch that uses proximity communication in accordance with embodiments of the present invention.

FIG. 7 presents a flowchart illustrating the process of transferring cells in a switch 300 that uses proximity communication in accordance with embodiments of the present invention. As described above, the switch 300 includes M switch chips 404, wherein a switching fabric, an input scheduler, an output arbiter, and other switch structures are included in each of the M switch chips 404. Each switch chip 404 is coupled to a subset of the inputs and is coupled to a subset of the outputs for switch 300. Each switch chip 404 transfers a cell to another switch chip when the cell needs to be output from an output included in the subset of outputs coupled to the other switch chips.

The process starts when a switch chip 404 receives cells from the subset of the set of inputs to the switch (step 700). Switch chip 404 then selectively transfers each of the cells to at least one output of the subset of the set of outputs coupled to the switch chip or of the subset of the set of outputs coupled to the other switch chips (step 702).

Figure 8:
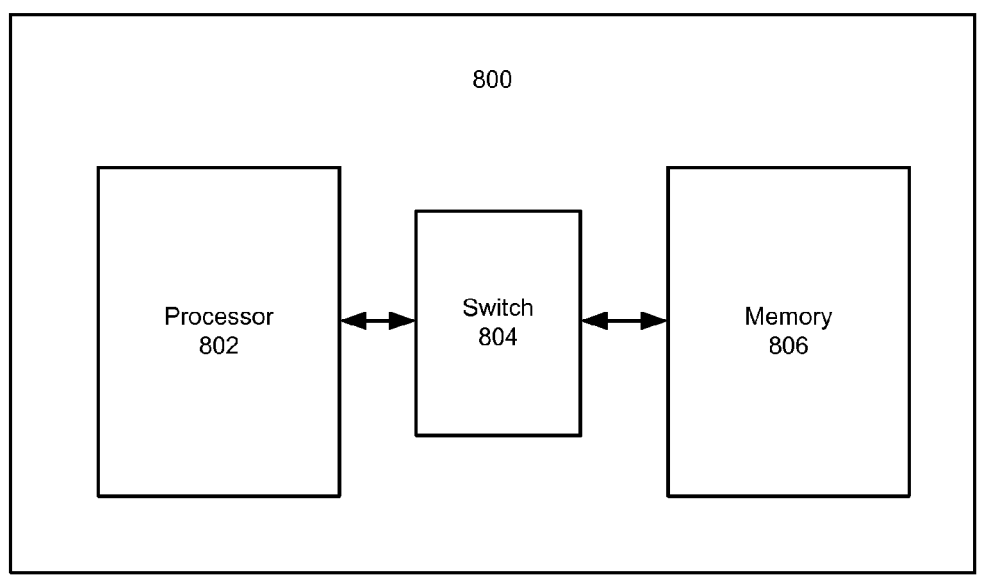
FIG. 8 presents a block diagram illustrating a computer system in accordance with an embodiment of the present invention.

FIG. 8 presents a block diagram illustrating a computer system in accordance with an embodiment of the present invention. Computer system 800 includes a processor 802, a switch 804, and a memory 808. Switch 804 includes multiple switch chips and is configured to transfer data between processor 802 and memory 808.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
    multiple switch chips that are coupled together and are configured to collectively function as a switch, wherein the multiple switch chips are configured to communicate with each other using proximity communication;
    wherein each switch chip is coupled to a subset of a set of inputs to the switch and wherein each switch chip is coupled to a subset of a set of outputs from the switch; and
    a transferring mechanism in each switch chip configured to receive cells from the subset of the set of inputs and to selectively transfer each of the cells to at least one output of the subset of the set of outputs coupled to the switch chip or of the subset of the set of outputs coupled to the other switch chips;
    a plurality of buffers in each switch chip, each buffer being coupled between the subset of inputs on a corresponding switch chip and a corresponding output, so that the buffer is exclusively shared among a subset of inputs coupled to a respective switch chip, wherein each output is coupled to a plurality of buffers, and wherein each of the buffers coupled to an output is coupled to a different subset of the set of the inputs to the switch;
    wherein the total number of buffers in the multiple switch chips equals the product of the number of outputs coupled to the switch and the number of switch chips.

2. The apparatus of claim 1, wherein each switch chip includes at least one output arbiter, wherein the output arbiter controls the forwarding of cells from the buffers to the outputs coupled to the switch chip.

3. The apparatus of claim 1, wherein each switch chip includes at least one flow control mechanism, wherein when a buffer fills up with cells that are waiting to be forwarded to an output, the flow control mechanism signals the corresponding switch chip to stop transferring cells until space is available in the buffer.

4. The apparatus of claim 1, wherein the proximity communication includes at least one of:
    capacitive coupling;
    inductive coupling; or
    optical coupling.

5. The apparatus of claim 1, wherein each switch chip includes:
    at least one output arbiter, wherein the output arbiter controls the forwarding of cells from the buffers to the outputs coupled to the switch chip;
    wherein when forwarding cells to the outputs coupled to the switch chip, the output arbiter is configured to forward a cell from each buffer in a round robin fashion, wherein when forwarding the cell from each buffer, the output arbiter is configured to acquire the cell from the next non-empty logical queue after the last logical queue served.

6. The apparatus of claim 1, further comprising an input-scheduling mechanism in each chip configured to schedule conflict-free transfers of cells from the subset of the inputs to the switch chip to the buffers that are shared among the subset of inputs.

7. The apparatus of claim 6, wherein the input-scheduling mechanism is configured as a parallel wrapped wave front arbiter.

8. A method, comprising:
    transferring data between the components in a system through a proximity communication switch;
    wherein the proximity communication switch includes multiple switch chips which are coupled together and are configured to collectively function as a switch, wherein the multiple switch chips communicate using proximity communication;
    wherein each switch chip is coupled to a subset of a set of inputs and a subset of a set of outputs for the switch, wherein each switch chip includes a set of buffers, each buffer being coupled between the subset of inputs on a corresponding one of the switch chips and a corresponding output, so that the buffer is exclusively shared among the subset of inputs coupled to the corresponding one of the switch chips, wherein each output is coupled to a plurality of buffers, wherein each of the buffers coupled to an output is coupled to a different subset of the set of the inputs to the switch, and wherein the total number of buffers in all of the switch chips equals the product of the number of outputs coupled to the switch and the number of switch chips; and
    wherein transferring data between the components comprises, for each switch chip:
        receiving one or more cells on one or more inputs in the subset of the set of inputs coupled to the switch chip;
        scheduling conflict-free transfers of the one or more received cells from the subset of the set of inputs to the corresponding buffers shared among the subset of inputs;
        transferring the received cells to the buffers in accordance with the schedule to be stored in the buffer to which the cell is transferred; and
        forwarding the cells from the buffers to the corresponding outputs coupled to the switch chip.

9. The method of claim 8, wherein the method further comprises using a parallel wrapped wave front arbiter to schedule the conflict-free transfers.

10. The method of claim 8, wherein for each switch chip, the method further comprises:
    using an output arbiter to control the forwarding of cells from the set of buffers to the corresponding output.

11. The method of claim 8, wherein for each switch chip, the method further comprises:
    when a buffer fills up with cells that are waiting to be forwarded to an output, signaling the corresponding switch chip to stop transferring cells until space is available in the buffer.

12. The method of claim 8, wherein the proximity communication includes at least one of:
    capacitive communication;
    inductive communication; or
    optical communication.

13. A computer system, comprising:
    at least one processor;
    at least one memory coupled to the at least one processor, wherein the at least one memory holds data and instructions for the at least one processor;
    multiple switch chips which are coupled together and are configured to collectively function as a switch, wherein the multiple switch chips are configured to communicate with each other using proximity communication;

wherein the switch is configured to transfer data between a set of components in the computer system, wherein the set of components includes the at least one processor and the at least one memory;

wherein each switch chip is coupled to a subset of a set of inputs to the switch and wherein each switch chip is coupled to a subset of a set of outputs from the switch; and a transferring mechanism in each switch chip configured to receive cells from the subset of the set of inputs and to selectively transfer the each of the cells to at least one output of the subset of the set of outputs coupled to the switch chip or of the subset of the set of outputs coupled to the other switch chips;

a plurality of buffers in each switch chip, each buffer being coupled between the subset of inputs on a corresponding switch chip and a corresponding output, so that the buffer is exclusively shared among a subset of inputs coupled to a respective switch chip, wherein each output is coupled to a plurality of buffers, and wherein each of the buffers coupled to an output is coupled to a different subset of the set of the inputs to the switch;

wherein the total number of buffers in the multiple switch chips equals the product of the number of outputs coupled to the switch and the number of switch chips.

14. The computer system of claim 13, wherein each switch chip includes at least one output arbiter, wherein the output arbiter controls the forwarding of cells from the buffers to the corresponding output.

15. The computer system of claim 13, wherein each switch chip includes at least one flow control mechanism, wherein when a buffer fills up with cells that are waiting to be forwarded to an output, the flow control mechanism signals the corresponding switch chip to stop transferring cells until space is available in the buffer.

16. The computer system of claim 13, wherein the proximity communication includes at least one of:
capacitive communication;
inductive communication; or
optical communication.

17. The computer system of claim 13, further comprising an input-scheduling mechanism in each chip configured to schedule conflict-free transfers of cells from the subset of the inputs to the switch chip to the buffers that are shared among the subset of inputs.

18. The computer system of claim 17, wherein the input-scheduling mechanism is configured as a parallel wrapped wave front arbiter.

* * * * *